Figure 1:
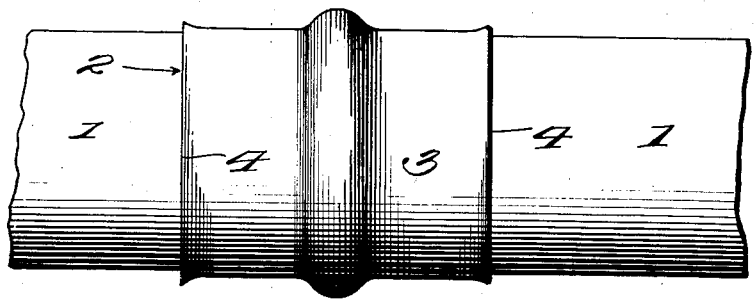

T. J. REDMON.
LOCK JOINT COUPLING FOR METAL PIPES.
APPLICATION FILED FEB. 12, 1914.

1,197,858.

Patented Sept. 12, 1916.

Witnesses

Inventor
Thomas J. Redmon.
By H. B. Willson & Co.
Attorneys

UNITED STATES PATENT OFFICE.

THOMAS J. REDMON, OF NORTH YAKIMA, WASHINGTON.

LOCK-JOINT COUPLING FOR METAL PIPES.

1,197,858.  Specification of Letters Patent.  Patented Sept. 12, 1916.

Application filed February 12, 1914. Serial No. 818,309.

*To all whom it may concern:*

Be it known that I, THOMAS J. REDMON, a citizen of the United States, residing at North Yakima, in the county of Yakima and State of Washington, have invented certain new and useful Improvements in Lock-Joint Couplings for Metal Pipes; and I do declare the following to be a full, clear, and exact description of the invention, such as will enable others skilled in the art to which it appertains to make and use the same.

This invention relates to improvements in pipe couplings and more particularly to those which are designed for coupling the meeting ends of metal pipes, such as those used in irrigating.

The main object of the invention is to provide a simple and efficient coupling of the character described which, when the pipe sections are driven into its opposite ends, will deflect the ends of said pipe sections and will thus form an efficient lock joint.

Figure 2:
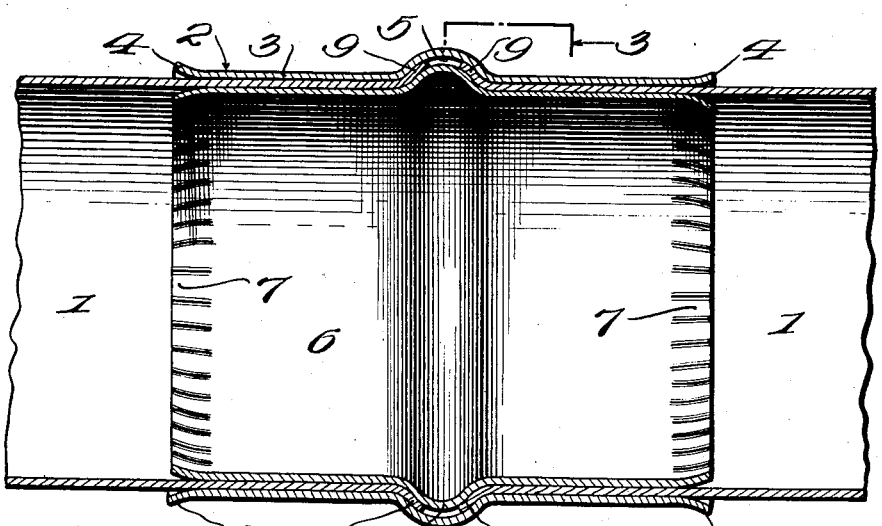
Figure 3:
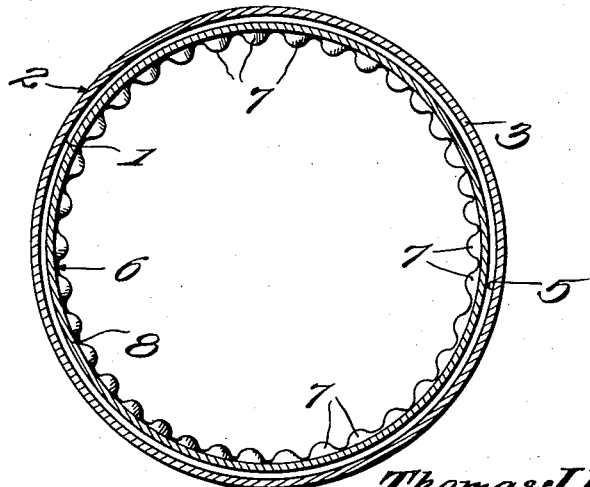

To the above end, the invention consists in providing a pair of metal tubes disposed one within the other and forming said tubes with inter-engaging bead and groove, as herein described and claimed and shown in the drawings, wherein:

Figure 1 is a side elevation of my improved pipe coupling showing its application; Fig. 2 is a central vertical longitudinal section thereof; and Fig. 3 is a transverse section taken on the line 3—3 of Fig. 2.

In the accompanying drawings, I have shown a pair of pipe sections 1 which are connected at their meeting ends by my improved coupling 2 in a manner now to be described.

The coupling 2 comprises two spaced tubular members here shown as an outer sleeve or tube 3 which is of suitable diameter and length and has its opposite ends flared outwardly as at 4, while its central portion is crimped to provide an internal annular groove 5.

Loosely fitting within the outer tube 3 is an inner tube 6 which is preferably of the same length as the section 3 and has its opposite ends crimped as at 7 in such a manner as to reduce said ends, the crimped ends of the inner tube 6 and the outwardly flared ends 4 of the outer tube 3 thus forming a guide for the insertion of the ends of the pipes 1. The central portion of the inner tube 6 is deflected outwardly to produce an external annular bead 8 which, as clearly shown in Fig. 2, fits loosely within the groove 5 of the section 3, said groove being of such depth and said bead being of such height as to effectually retain the outer and inner tubes 3 and 6 in proper relative position.

In the operation of the device, the inner ends of the pipe sections 1 are preferably dipped in asphaltum cement after which they are driven into the space between the outer and inner tubes 3 and 6 and into contact with the exterior of the bead 8. Upon imparting a continued inward movement to said pipe sections, their inner ends will be deflected outwardly as clearly shown at 9 into the space between the groove 5 and the bead 8, thus forming a very simple yet effective lock joint, which, whether the ends of said tubes are dipped in cement or not, will form a water tight joint.

As hereinbefore suggested the couplings constituting the gist of the present invention are designed more particularly for uniting the ends of metal pipe suited for irrigating purposes. It is a well known fact that considerable mud and sediment gather in water used for irrigating purposes and that this mud or sediment will lodge wherever an obstruction occurs within the pipe. In the present case, the inner tube 6 is fluted as indicated at 7 not only for the purpose of facilitating the insertion of the pipe 1 but in order to provide shoulders behind which the mud or sediment above mentioned, may accumulate, whereby the water flowing through the pipe will positively seal the joint, thus making the same absolutely watertight.

Having thus described my invention, what I claim as new and desire to secure by Letters Patent is:

1. The combination with the meeting ends of a pair of pipes, of an inner tubular coupling section disposed in said meeting ends and contacting closely therewith, whereby to form a substantially watertight joint, the ends of said section being deflected inwardly from the pipes to provide annular wedge-shaped recesses in which sediment flowing through the pipes may wedge, and an outer tubular section embracing said ends of the pipes and contacting therewith to retain them in binding contact with the inner section.

2. The combination with the meeting ends of a pair of pipes, of an inner tubular coupling section disposed in said meeting ends and contacting closely therewith, whereby to form a substantially watertight joint, the ends of said section being crimped and deflected inwardly from the pipes to provide annular wedge-shaped recesses in which sediment flowing through the pipes may wedge, and an outer tubular section embracing said ends and contacting therewith to retain them in binding contact with the inner section.

3. A device of the character described comprising an outer tubular member having its opposite ends flared outwardly and provided adjacent its center with a continuous annular internal groove, an inner tubular member arranged within the outer one and spaced therefrom, said inner tubular member having its ends flared inwardly and also having at its central portion a continuous annular external bead disposed within but spaced from the wall of said groove, and a pair of pipe sections driven into the flared ends of said members and having their inner extremities flared outwardly between the wall of said groove and said bead, substantially as described.

4. As an article of manufacture, a lock joint or coupling for metal drain pipes consisting of two spaced metal tubes arranged one within the other and having their ends flared in opposite directions, the outer tube having adjacent its center an internal annular groove and the inner one having an external annular bead to project into said groove to loosely retain the inner tube within the outer one.

5. The method of securing a pair of pipes in a coupling composed of inner and outer tubular members, one having an annular groove and the other an annular bead fitting loosely in said groove, said method consisting in inserting the meeting ends of the pipes between the inner and outer tubular members and in driving said ends against the bead to flare them into the groove.

In testimony whereof I have hereunto set my hand in presence of two subscribing witnesses.

THOMAS J. REDMON.

Witnesses:
A. B. WEED,
JOHN R. PECK.